(No Model.)

R. NIEWERTH.
ELECTRIC ARC LAMP.

No. 512,481. Patented Jan. 9, 1894.

WITNESSES:

INVENTOR
Regina Niewerth
BY
ATTORNEYS.

UNITED STATES PATENT OFFICE.

REGINA NIEWERTH, OF BERLIN, GERMANY.

ELECTRIC-ARC LAMP.

SPECIFICATION forming part of Letters Patent No. 512,481, dated January 9, 1894.

Application filed March 22, 1893. Serial No. 467,141. (No model.)

*To all whom it may concern:*

Be it known that I, REGINA NIEWERTH, a subject of the Emperor of Germany, residing at Berlin, in the Kingdom of Prussia and Empire of Germany, have invented certain new and useful Improvements in Electric-Arc Lamps; and I do hereby declare the following to be a full, clear, and exact description of the invention, such as will enable others skilled in the art to which it appertains to make and use the same, reference being had to the accompanying drawings and the figures of reference marked thereon, which form a part of this specification.

In the use of the voltaic arc for illuminating purposes, as well as for the heating, melting and distilling of metals or other substances, certain difficulties were experienced, by which the general application of the electric current was considerably circumscribed. In electric lighting, the regulating of the current and carbons by means of the clock-train mechanisms heretofore provided, is far from accurate so that always irregularities in the light are produced. These irregularities can never be entirely overcome as the rigidity of the mechanical elements of the regulating mechanism will always form a considerable obstacle. All other constructions of lamps that work without a regulating clock-train, are subject to still greater irregularities and render the use of the same nearly impossible.

For melting metals by the voltaic arc such arcs were used which were formed either between two or more horizontal or vertical electrodes that were formed of fixed or adjustable carbons. These constructions however were objectionable because the voltaic arc is easily interrupted, either by the arrangement of the carbons at a greater distance from each other or by other circumstances, whereby the melting process is also interrupted and can frequently not be started again. In case of chemical decompositions or when melting substances which are non-conductive when in cold and solid state, the interruption of the arc presents serious difficulties. By the constructions for producing the voltaic arc heretofore, a uniform distribution of the heat produced by the voltaic arc is not possible as the temperature is exceedingly high at one point, so that a great waste of material is the result.

The invention relates to an electric arc lamp by which the disadvantages before mentioned are overcome, and by which a powerful and steady arc is obtained.

Figure 1:
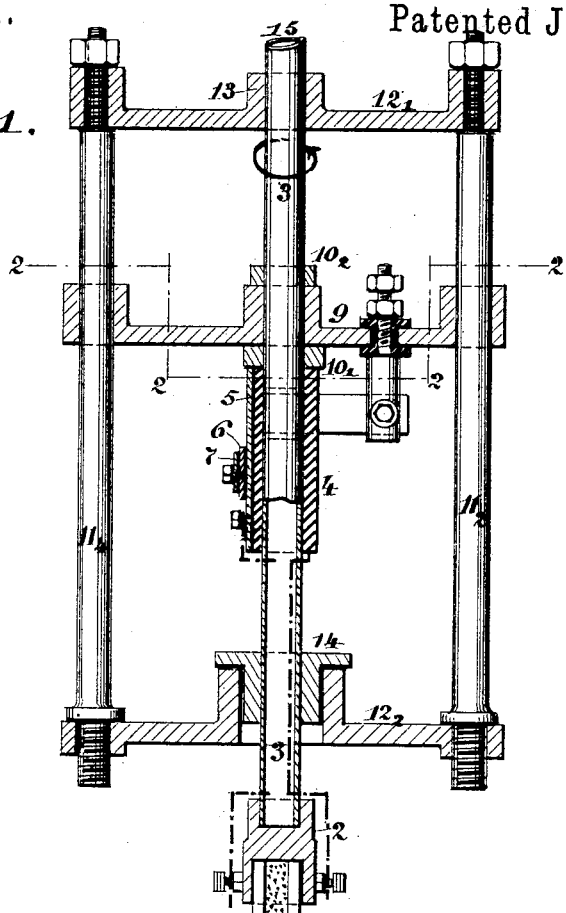
Figure 2:
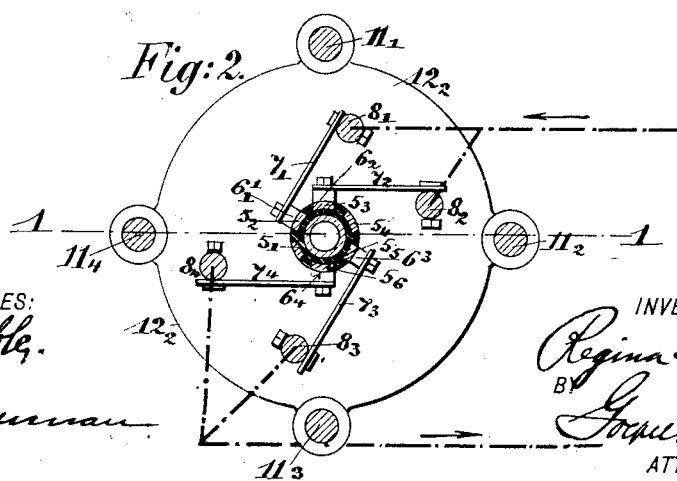

In the accompanying drawings, Figure 1, is a vertical, longitudinal section of my improved electric arc lamp, on the line 1, 1, Fig. 2. Fig. 2, is a horizontal section on the line 2, 2, Fig. 1, and Fig. 3, is a horizontal section on line 3, 3, Fig. 1.

Similar figures of reference indicate corresponding parts.

Figure 3:
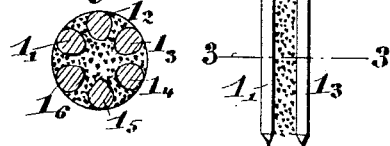

In the drawings, $1'$, $1^2$, $1^3$, $1^4$, $1^5$ and $1^6$, represent six carbon-rods or pencils, which are separated from each other by a suitable insulating material and grouped in a circle, as shown in Fig. 3. The carbons are supported in a socket 2, of non-conducting material, which is attached to the lower end of a tubular shaft 3. On the shaft 3, is arranged a commutator 4, which is composed of six segments, $5'$, $5^2$, $5^3$, $5^4$, $5^5$, and $5^6$, that are made of conducting material, said segments being separated by a body of insulating material. Contact-pieces or brushes $6'$, $6^2$, $6^3$, and $6^4$, are arranged adjacent to the segments, said brushes being made of conductive material and pressed against the commutator-segments by springs $7'$, $7^2$, $7^3$, $7^4$, which are supported by screw-posts $8'$, $8^2$, $8^3$, $8^4$. The screw-posts are mounted on a guide-disk 9 and insulated from the same. The guide-disk 9 is held loosely in place on the tubular shaft 3 by the collars $10'$, $10^2$, and guided by sleeves on upright rods $11'$, $11^2$, $11^3$ and $11^4$, of the top and bottom disks $12'$ and $12^2$. The top and bottom plates are provided with bearings 13 and 14, from the tubular shaft 3 so that it can freely rotate in the same. The tubular shaft 3 is shown broken off at 15, Fig. 1, and at this point or at any other point is arranged a suitable electro-motor by which rotary motion is imparted to the shaft 3.

The motor is not shown in the drawings, as it is well known and forms no part of this invention. The screw-posts $8'$ and $8^2$ are connected with a positive-conductor and the screw-posts $8^3$ and $8^4$ with a negative conductor, which conductors in turn are connected with a suitable source of electricity. By insulated wires which are arranged in the tubular shaft 3 and shown by dotted lines in Fig. 1, the commutator-segment $5'$ is connected with the carbon $1'$, the segment $5^2$ with the carbon $1^2$, segments $5^4$ with the carbon $1^4$, segment $5^5$ with carbon $1^5$ and so on.

The operation is as follows: The current passes from the positive conductor to the screw-posts $8'$ and $8^2$, by the springs to the brushes $6'$, $6^2$. The negative conductor is connected with the screw-posts $8^3$ and $8^4$ and by the springs $7^3$ and $7^2$ with the brushes $6^3$ and $6^4$. As the brushes are in contact with the segments of the commutator, the current will pass from said brushes to the segments of the commutator 4 to the several carbon-electrodes 1, in such a manner that there will be positive electricity in the electrodes $1'$ and $1^2$, and negative electricity in the electrodes $1^4$ and $1^5$. When the opposite electrodes $1^4$ and $1^5$ and $1^2$ and $1^4$ are connected by a suitable conductor and this conductor is removed an arc will be formed between each of the two electrodes. By imparting rotary motion to the shaft 3 the commutator 4 and the carbons 1 are rotated with the same. As shown in the drawings, the segments 5 of the commutator 4 are made wide enough so that while they pass by the brushes 6 they will never be out of contact with the brushes, that is to say, when the shaft 3 rotates, the several commutator-segments will pass under the several brushes and before the latter leave one segment, they will be upon the adjacent segment. When the shaft 3 is rotated, the voltaic arcs will always remain in the position which they originally assumed, but the position of the carbons will change and their polarity will continually change, that is the carbons will alternately have a negative and positive polarity, whereby they are steadily and uniformly consumed. Furthermore as all the electrodes distribute the current in quickly following intervals, the arc will fill up uniformly the space below the electrodes and assume a hemispherical shape. It is obvious that the tubular shaft 3 can be arranged so as to be stationary, in which case the brushes have to be rotated around the commutator 4. The electrodes and commutator can also be so disposed that one, three or more arcs may be formed and sustained at the lower end of the carbons.

I do not claim broadly in this application a series of electrodes disposed around a common axis and means for supplying the electrodes in pairs successively with electric currents in opposite directions, as that subject-matter is claimed in my application, Serial No. 489,059, filed October 24, 1893.

Having thus described my invention, I claim as new and desire to secure by Letters Patent—

1. An electric arc-lamp, consisting of a rotary shaft, a series of carbons supported on said shaft and means for supplying the several carbons with the electric current and imparting alternately positive and negative polarity to the same, substantially as set forth.

2. An electric arc-lamp, comprising a series of electrodes arranged around a common center and adapted to be rotated on their axis, a commutator and brushes for supplying the electric current and imparting alternate polarities to said electrodes, substantially as set forth.

3. An electric arc-lamp, comprising a rotary shaft and a series of electrodes supported on said shaft, a commutator on said shaft and brushes sliding over the segments of the commutator, said brushes being connected with the source of electricity, substantially as set forth.

4. In an electric arc-lamp, the combination, with a rotary-shaft, a series of electrodes supported on said shaft, a commutator arranged on said shaft, and formed of metallic segments, said segments being conductively connected with the electrodes, brushes placed in contact with the segments and screw-posts for supporting the spring-arms of the brushes, substantially as set forth.

In testimony whereof I affix my signature in presence of two witnesses.

REGINA NIEWERTH.

Witnesses:
ADOLPH HENNIGER,
OTTO RICHTER.